United States Patent [19]
Siebold

[11] 3,768,877
[45] Oct. 30, 1973

[54] CONTROL APPARATUS FOR TWO POWER BRAKES

[75] Inventor: Manfred Siebold, Boeblingen, Germany

[73] Assignee: Robert Bosch GmbH, Stuttgart, Germany

[22] Filed: Feb. 12, 1971

[21] Appl. No.: 114,938

[30] Foreign Application Priority Data
Feb. 26, 1970 Germany............... P 20 8 894.2

[52] U.S. Cl. .................................................. 303/52
[51] Int. Cl............................................... B60t 15/06
[58] Field of Search.............. 137/627.5, 625.25; 303/50, 52, 53, 54

[56] References Cited
UNITED STATES PATENTS
3,580,646   5/1971   Ternent ............................... 303/52
3,507,545   4/1970   Page et al. ............................ 303/52

FOREIGN PATENTS OR APPLICATIONS
92,118   9/1958   Netherlands......................... 303/52
798,816   7/1958   Great Britain ....................... 303/52

Primary Examiner—Milton Buchler
Assistant Examiner—D. C. Butler
Attorney—Michael S. Striker

[57] ABSTRACT

Two power brakes are controlled by sequentially operative first and second valves which connect, when the first valve is actuated by an operator-influenced reaction member, high pressure air to the brakes. A stem connects the reaction member with lost motion to the second valve to operate the same when the first brake fails, and levers connect a piston of the second valve with the reaction member to indicate to the operator that the second brake operates.

10 Claims, 1 Drawing Figure

Patented Oct. 30, 1973
3,768,877
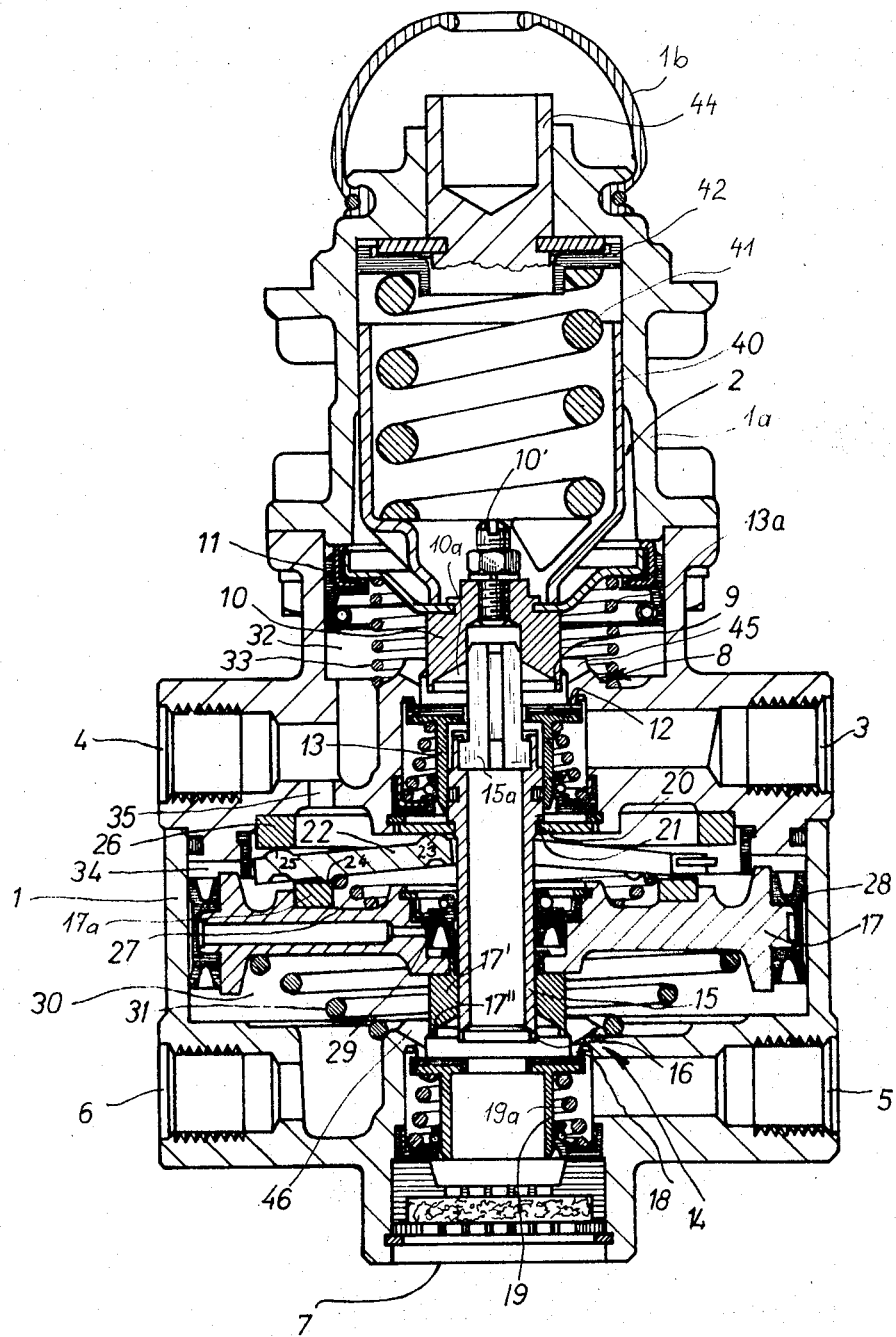
INVENTOR.
MANFRED SIEBOLD
BY Michael S. Striker
Attorney

CONTROL APPARATUS FOR TWO POWER BRAKES

BACKGROUND OF THE INVENTION

The U.S. Pat. No. 3,266,850 discloses a brake valve arrangement in which, in the event that the pressure fails in a first brake circuit, the brake pressure prevailing in a second brake circuit is transmitted by a stem which forms an integral structure with a reaction piston.

The arrangement is not only difficult to assemble, but has the disadvantage that the ratio between the force required for operation, and the reaction pressure, which corresponds to the brake pressure, can only be varied by differently constructing the combined reaction piston and stem, and a large valve piston.

SUMMARY OF THE INVENTION

It is one object of the invention to overcome the disadvantage of the prior art, and to provide a control apparatus for two brakes, which can be easily assembled, and has no awkwardly shaped parts.

Another object of the invention is to provide a control apparatus with two power brakes in which the ratio between brake pressure and indicated reaction pressure can be easily varied.

With these objects in view, a valve piston is mounted axially movable on a stem, and several levers are arranged in a star-shaped pattern about the axis of the stem, and abut the piston and the stem for transmitting a force when the pressure in the first brake fails.

An embodiment of the invention comprises a housing; a first valve means in the housing including a reaction means operable by an operator between a normal position and a braking position in which the first valve connects a variable pressure chamber in the housing with low pressure fluid and high pressure fluid, respectively; a second valve including a piston movable in the housing between normal and braking positions in which the second valve connects a second variable pressure chamber in the housing with low pressure fluid and high pressure fluid, respectively; and force transmitting means connecting the reaction means with the second valve.

The first and second variable pressure chambers are located on opposite sides of the piston, so that high pressure in the first pressure chamber moves the piston to the braking position in which high pressure fluid enters the second variable pressure chamber.

In the event that no high pressure is produced in the first variable pressure chamber, the force transmitting means are operated, preferably with lost motion, by the reaction means to actuate the second valve to connect the second variable pressure chamber with high pressure fluid so that the high pressure in the second variable pressure chamber displaces the piston into the first variable chamber. The force transmitting means also connect the piston with the reaction means so that the brake pressure acting on the second brake is indicated to the operator by the presure exerted by the piston and force transmitting means on the reaction means.

In the preferred embodiment of the invention, the force transmitting means include a stem operatively connecting the reaction means with the second valve and having an abutment, and a plurality of levers angularly spaced about the stem and being mounted in the jousing for angular movement. Portions of the levers engage the piston and the abutment on the stem, respectively, so that displacement of the piston by high pressure in the second variable pressure chamber is transmitted by the levers to the stem, and by the same to the reaction means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE of the drawing is an axial sectional view illustrating a control apparatus for two power brakes, in accordance with a preferred embodiment of the invention.

DESCRIPTION OF THE PREFERRED EMBODIMENT

A housing 1 envelopes a first valve 8, and a second valve 14, and has a housing portion 1a closed by cap 1b, and enveloping actuating means including a spring 41 resting on a tubular member 40, and abuting a plate 42 connected with a movable member 44 which can be connected with a brake pedal.

Housing 1 has on one side connector openings 4 and 6 communicating with chambers in first and second brake means, not shown, and has on the other side connector openings 3 and 5 which are connected to a source of pressure fluid, such as compressed air, connector openings being associated with valves 8 and 14, respectively.

The first valve 8 has a reaction means 10 in the form of a tubular member having a closed central bore 10a, and a circular valve seat 9. A screw 10' is provided at the center of reaction means 10, and can be adjusted to project into the bore 10a. Reaction means 10 is surrounded by an annular housing wall having slots 45, and a valve seat 12 cooperating with a valve member 13 which normally abuts the stationary valve seat 12 due to the action of a spring 13a. Reaction means 10 is fixedly connected with a piston 11 whose outer periphery is guided in housing 1, and which is engaged by a spring 33 and biased to move to an upper position together with reaction means 10.

The second valve 14 has a large piston 17 which is axially movable and has a central opening through which a hollow stem 15 passes so that piston 17 is guided along stem 15, and also with its outer periphery in housing 1. Piston 17 is connected with an annular member 17' which has an annular valve seat 17''. The lower end of valve member 17 is guided in an annular housing part having slots 46. The lower end of the hollow stem 15 passes through valve member 17 and has a valve seat 16. The stationary housing portion 46 has an annular valve seat 18 cooperating with a second valve member 19 biassed by a spring 19a.

The hollow stem 15 has an outer shoulder 21 against which an annular plate 20 abuts to form a flange on stem 15. Below flange 20, three levers are arranged in a star-shaped pattern angularly spaced about the axis of stem 15. The radially extending levers 22 have radially inner ends 23 abutting flange 20, radially outer ends 25 abutting a ring 26 fixed to the housing 1, and an intermediate portion 25 abutting a ring 17a fixed to piston 17. A coil spring 27 abuts piston 17 and levers 22 to urge the levers upward into engagement with flange 20 and ring 26.

Piston 17 has about the outer periphery thereof a double seal 28 slidingly engaging the cylindrical surface of housing 1, and an inner double seal 29 sliding on the outer surface of the hollow stem 15. A coil spring 31 abuts housing portion 46 and the bottom face of piston 17 to urge the same with ring 17a upward so that ring 17a abuts the projecting portion 24 of the lever 22.

A first variable pressure chamber 32 is formed in the housing between piston 11 of the first valve 8, and piston 17 of the second valve 14. The chamber 32 communicates through the connector opening 4 with a brake cylinder, not shown, so that a first brake is operated when high pressure fluid enters the chamber 32. The lower portion 34 of the first variable pressure chamber 32 is connected with the connector opening 4 by a duct 35. Levers 22 are located in the lower portion 34 of the first variable pressure chamber 32.

A second variable pressure chamber 30 is formed between the bottom face of piston 7 and housing portions, and communicates with the connector opening 6 which is connected with a brake cylinder of a second brake, not shown. The bottom of housing 1 has an inlet 7 for atmospheric air, while the connector openings 3 and 5 communicate with a storage container containing compressed air. A member 15a is attached to the upper end of the hollow stem 15, and projects with its upper end into the central bore 10a in reaction means 10, the central bore 10a being closed by screw 10'.

Before the brake pedal, not shown, and the actuating means 2 are actuated, the apparatus is in a normal position in which the first and second brakes are not actuated. The valve seat 12 is engaged by the movable valve member 13 of the first valve means 8, while the movable valve member 19 of the second valve mans 14 abuts the stationary valve seat 18. Consequently, the openings 3 and 5 are closed, and no compressed air can be supplied to the variable pressure chamber 32 of the first valve 8, or to the second variable pressure chamber 30 of the second valve 14.

The variable pressure chamber 32 is connected through slots 45 with a space between reaction means 10 and first valve member 13, which space communicates through the hollow stem 15 with the inlet 7 for atmospheric air. In the same manner, the variable pressure chamber 30 is connected through slots 46 with the inlet 7.

When the actuating means 2 are operated, member 40 moves downward and acts on piston 11 and reaction means 10 to move the same downward until valve seat 9 abuts valve member 13 and then moves the same downward against the action of spring 13a so that a gap develops between valve member 13 and stationary valve seat 12 through which pressure air from inlet 3 can flow into the space surrounding the reaction means 10, and from this space through slots 45 into the first variable pressure chambers 32,34, so that pressure fluid is supplied to the brake cylinder of the first brake, which is operated. A force corresponding to the brake pressure of the first brake is transmitted to reaction means 10 through the piston 11 which is subjected to the pressure in the variable pressure chamber 32. Consequently, the operator feels that a brake action is exerted, and has to hold the brake pedal as long as he wishes to maintain the first brake in the braking condition.

The high pressure prevailing in the first variable pressure chamber 32 and 34 acts on the large piston 17, and moves the same downward. The force transmitting levers 22 remain in the original position in which they are held by spring 27. The levers 22 also hold the stem 15 with member 15a in the initial upper position.

When piston 17 moves downward with annular member 17', valve seat 17" of the same first abuts valve member 19, and then presses the same downward against the action of spring 19a so that the valve member 19 separates from the stationary valve seat 18, and pressure air from inlet 5 can flow through slots 46 into the second variable pressure chamber 30 so that the same high pressure acts on opposite sides of piston 17, and the same does not move further downward. However, no reaction force is transmitted from piston 17 through levers 22 and stem 15,15a to reaction means 10, so that the operator feels only the reaction force acting on reaction means 10 due to the pressure in the variable pressure chamber 32 acting on piston 11.

When the brake pedal is no longer actuated, and the actuating means 2 return the initial position due to the action of spring 41, all movable parts of the first and second valve means 8 and 14 return to the initial positions.

Assuming that the pressure in the first brake circuit fails, that is when no high pressure fluid enters the first variable pressure chamber 32 when the brake pedal and reaction means 10 are operated, the lower end of the adjusting screw 10' abuts the upper part 15a of stem 15 and moves stem 15 downward until valve seat 16 abuts the second valve member 19 and displaces the same to a position in which the inlet 7 is disconnected from the second variable pressure chamber 31, which is connected with the high pressure fluid inlet 5. Pressure fluid flows through connecting opening 6 to the brake chamber of the second brake, and operates the same, while the high pressure fluid in the second variable pressure chamber 30 acts on the bottom surface of piston 17 to urge the same upward, which is possible since there is no high pressure fluid in the first variable pressure chamber 32,34. The upward movement of piston 17 is relative to the stem 15,15a which is held in the lower actuated position by the pedal pressure. The upward moving piston 17 presses ring 17a against portions 24 of levers 22, so that the same pivot about the outer end portions 25, and the inner end portions 23 abut flange 20, moving stem 15, 15a upward so that motion is transmitted to screw 10' which abuts the upper end face of part 15a, and reaction means 10 is urged upward, exerting a reaction force on the brake pedal, not shown, indicating to the operator that the second brake is functioning.

The brake force exerted by the second brake, and the force transmitted by piston 17 may be very great, but the reaction force acting on reaction means 10 depends on the ratio between the total length of levers 22, and the length of the lever arm between portions 24 and 23. By selecting different levers 22, the reaction force acting on reaction means 10 can be adapted to desired value. Under these conditions, piston 17 acts not only as valve part, but also as reaction member. The reaction force acting on the stem 15, returns the movable parts of valves 8 and 14 when the pressure from the brake pedal is released.

Stem 15 with portion 15a constitutes a force transmitting means which is connected by lost motion means including portion 15a and bore 10a, with reaction means 10,10'. Levers 22 constitute second force transmitting means connecting piston 17 with flange plate 20 and the first force transmitting means 15,15a. The lost motion connection 15a, 10a assures that the valve member 19 is not operated by stem 15 during the operation of valve member 19 by piston 17 and annular member 17' due to the desired high pressure in the first variable pressure chamber 32,34.

The above-described force transmitting means, and piston 17, are easy to assemble and disassemble, and permit exchange of levers 22 for obtaining a different force transmission ratio between piston 17 and reaction means 10 where the brake pressure is felt by the operator.

It will be understood that each of the elements described above, or two or more together, may also find a useful application in other types of hydraulic control apparatus for two power brakes differing from the types described above.

Wile the invention has been illustrated and described as embodied in a hydraulic control apparatus in which upon failure of the first brake, a second brake is automatically operated and transmits a reaction force, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended witin the meaning and range of equivalence of the following claims.

What is claimed as new and desired to be protected by Letters Patent is set forth in the appended claims.

I claim:

1. Control apparatus for two power brakes, comprising a housing; first valve means in said housing including a reaction means operable by an operator between normal and braking positions in which said first valve means connects a first variable pressure chamber in said housing with low pressure fluid and high pressure fluid, respectively, said first chamber being adapted to communicate with a first brake; second valve means including piston means movable in said housing between normal and braking positions in which said second valve means connects a second variable pressure chamber in said housing with low pressure fluid and high pressure fluid, respectively, said second chamber being adapted to communicate with a second brake, said first and second variable pressure chambers being located on opposite sides of said piston means so that high pressure in said first variable pressure chamber moves said piston means to said braking position in which high pressure fluid enters said second variable pressure chamber and balances the pressure in said first variable pressure chamber; first force transmitting means connecting said reaction means with said second valve means so that in the event that no high pressure is produced in said first variable pressure chamber, said force transmitting means are operated by said reaction means to actuate said second valve means to connect said second variable pressure chamber with high pressure fluid so that the high pressure in said second variable pressure chamber displaces said piston means into said first variable pressure chamber; and second force transmitting means connecting said piston means with said first force transmitting means so that the pressure acting on said piston means and second brake is indicated to the operator by the pressure transmitted from said piston means to said reaction means, said second force transmitting means including lever means mounted in said housing and engaging said piston means and said first force transmitting means so that displacement of said piston means by high pressure fluid in said second variable pressure chamber is transmitted from said piston means through said lever means to said first force transmitting means and by said first force transmitting means to said reaction means.

2. Apparatus as claimed in claim 1 wherein said first force transmitting means include lost motion means and a force transmitting member operatively connecting said reaction means with said second valve means.

3. Control apparatus for two power brakes comprising a housing; first valve means in said housing including a reaction means operable by and operator between normal and braking positions in which said first valve means connects a first variable pressure chamber in said housing with low pressure fluid and high pressure fluid, respectively, said first chamber being adapted to communicate with a firt brake; second valve means including piston means movable in said housing between normal and braking positions in which said second valve means connects a second variable pressure chamber in which said housing with low pressure fluid and high pressure fluid, respectively, said second chamber being adapted to communicate with a second brake, said first and second variable pressure chambers being located on opposite sides of said piston means so that high pressure in said first variable pressure chamber moves said piston means to said braking position in which high pressure fluid enters said second variable pressure chamber and balances the pressure in said first variable pressure chamber; first force transmitting means connecting said reaction means with said second valve means so that in the event that no high pressure is produced in said first variable pressure chamber, said force transmitting means are operated by said reaction means to actuate said second valve means to connect said second variable pressure chamber with high pressure fluid so that the high pressure in said second variable pressure chamber displaces said piston means into said first variable pressure chamber, said first force transmitting means including a stem operatively connecting said reaction means with said second valve means and having an abutment; and second force transmitting means connecting said piston means with said first force transmitting means so that the pressure acting on said piston means and second brake is indicated to the operator by the pressure transmitted from said piston means to said reaction means, said second force transmitting means including a plurality of levers mounted in said housing for angular movement and engaging piston means and said abutment so that displacement of said piston means by high pressure in said second variable pressure chamber is transmitted by said levers to said stem and by the same to said reaction means.

4. Apparatus as claimed in claim 3 wherein said piston means has a central opening through which said stem passes for movement relative to said piston means.

5. Apparatus as claimed in claim 3 wherein said stem is hollow for supplying low pressure fluid to said first variable pressure chamber, and has an annular valve seat; wherein said second valve includes a spring biased valve member mounted in said housing and operated by said valve seat when said stem is operated by said reaction means so that high pressure fluid is connected with said second variable pressure chamber.

6. Apparatus as claimed in claim 3 wherein said piston means has a central opening through which said stem passes for movement relative to said piston means; wherein said abutment includes a flange surrounding said stem; and wherein said lever means are angularly spaced about said stem and have radially inner ends abutting said flange, and radially outer fulcrum ends abutting said housing, and portions intermediate said inner and outer ends abutting said piston means.

7. Apparatus as claimed in claim 6 wherein said lever means are located in said first variable pressure chamber.

8. Apparatus as claimed in claim 6 wherein said flange is movably mounted on said stem; wherein said stem has an annular shoulder; and wherein said force transmitting means include a spring means urging said inner ends of said lever means into abutment with said flange so that said movable flange is pressed against said shoulder.

9. Apparatus as claimed in claim 6 wherein said reaction means includes a piston having an outer periphery in sealing contact with said housing; wherein said first variable pressure chamber is located between said piston and said piston means; and wherein said lever means are located in said first variable pressure chamber.

10. Apparatus as claimed in claim 3 wherein said reaction means has a central closed bore into which said stem projects, spaced from the closed end of said bore in said normal position of said reaction means so that motion is lost and said second valve means is not operated by said stem to connect said second variable pressure chamber with high pressure fluid during movement of said reaction means to said braking position thereof and during consequent movement of said piston means to said braking position thereof; and wherein said stem is engaged by the closed end of said bore, and displaced by said reaction means when said piston means is not moved to said braking position so that the displaced stem operates said second valve means to connect said second variable pressure chamber with high pressure fluid.

* * * * *